United States Patent
Nagai

(10) Patent No.: US 11,915,886 B2
(45) Date of Patent: Feb. 27, 2024

(54) SOLID ELECTROLYTIC CAPACITOR

(71) Applicant: ROHM CO., LTD., Kyoto (JP)

(72) Inventor: Toshiyuki Nagai, Kyoto (JP)

(73) Assignee: KYOCERA AVX Components Corporation, Fountain Inn, SC (US)

(*) Notice: Subject to any disclaimer, the term of this patent is extended or adjusted under 35 U.S.C. 154(b) by 91 days.

(21) Appl. No.: 17/603,074

(22) PCT Filed: Apr. 22, 2020

(86) PCT No.: PCT/JP2020/017282
§ 371 (c)(1),
(2) Date: Oct. 12, 2021

(87) PCT Pub. No.: WO2020/218319
PCT Pub. Date: Oct. 29, 2020

(65) Prior Publication Data
US 2022/0189706 A1    Jun. 16, 2022

(30) Foreign Application Priority Data
Apr. 25, 2019  (JP) .................. 2019-084021

(51) Int. Cl.
*H01G 9/08*     (2006.01)
*H01G 9/10*     (2006.01)
*H01G 9/15*     (2006.01)
*H01G 9/052*    (2006.01)

(52) U.S. Cl.
CPC .............. *H01G 9/08* (2013.01); *H01G 9/10* (2013.01); *H01G 9/15* (2013.01); *H01G 9/052* (2013.01)

(58) Field of Classification Search
CPC ................................ H01G 9/15; H01G 9/08
See application file for complete search history.

(56) References Cited

U.S. PATENT DOCUMENTS

| | | |
|---|---|---|
| 4,001,655 A | 1/1977 | Voyles et al. |
| 4,039,904 A | 8/1977 | Klein et al. |
| 4,945,452 A | 7/1990 | Sturmer et al. |
| 5,111,327 A | 5/1992 | Blohm et al. |
| 5,457,862 A | 10/1995 | Sakata et al. |

(Continued)

FOREIGN PATENT DOCUMENTS

| | | |
|---|---|---|
| JP | S 63102309 A | 5/1988 |
| JP | H 03280523 A | 12/1991 |

(Continued)

OTHER PUBLICATIONS

Safety Data Sheet for 1H, 1H,2H,2H-Perfluorooctyltriethoxysilane from Sigma-Aldrich, 2012, 6 pages.

(Continued)

*Primary Examiner* — Eric W Thomas
(74) *Attorney, Agent, or Firm* — Dority & Manning, P.A.

(57) ABSTRACT

A solid electrolytic capacitor includes: a porous sintered body made of a valve metal; an anode wire that has a portion extending inside the porous sintered body, and that protrudes from the porous sintered body; a dielectric layer formed on the porous sintered body; a solid electrolyte layer formed on the dielectric layer; a cathode layer formed on the solid electrolyte layer; and a protective film having at least a portion formed on the cathode layer. The protective film has a glass transition point of 180° C. or lower.

10 Claims, 12 Drawing Sheets

(56) References Cited

U.S. PATENT DOCUMENTS

| | | | |
|---|---|---|---|
| 5,473,503 A | 12/1995 | Sakata et al. | |
| 5,729,428 A | 3/1998 | Sakata et al. | |
| 5,812,367 A | 9/1998 | Kudoh et al. | |
| 6,072,694 A | 6/2000 | Hahn et al. | |
| 6,191,013 B1 | 2/2001 | Hahn et al. | |
| 6,197,252 B1 | 3/2001 | Bishop et al. | |
| 6,229,688 B1 * | 5/2001 | Kobayashi | H01G 9/15 361/523 |
| 6,322,912 B1 | 11/2001 | Fife | |
| 6,324,051 B1 | 11/2001 | Igaki et al. | |
| 6,391,275 B1 | 5/2002 | Fife | |
| 6,416,730 B1 | 7/2002 | Fife | |
| 6,442,016 B2 | 8/2002 | Fukuyama et al. | |
| 6,449,140 B1 | 9/2002 | Saki et al. | |
| 6,472,468 B1 | 10/2002 | Omura | |
| 6,507,482 B2 | 1/2003 | Harada et al. | |
| 6,519,135 B2 | 2/2003 | Sano et al. | |
| 6,527,937 B2 | 3/2003 | Fife | |
| 6,576,099 B2 | 6/2003 | Kimmel et al. | |
| 6,592,740 B2 | 7/2003 | Fife | |
| 6,635,729 B1 | 10/2003 | Groenendaal et al. | |
| 6,639,787 B2 | 10/2003 | Kimmel et al. | |
| 6,652,640 B2 | 11/2003 | Asai et al. | |
| 6,674,635 B1 | 1/2004 | Fife et al. | |
| 6,737,370 B2 | 5/2004 | Espe | |
| 6,798,645 B2 | 9/2004 | Melody et al. | |
| 6,845,004 B2 | 1/2005 | Melody et al. | |
| 6,906,913 B2 | 6/2005 | Kochi et al. | |
| 6,987,663 B2 | 1/2006 | Merker et al. | |
| 7,125,429 B2 | 10/2006 | Melody et al. | |
| 7,220,397 B2 | 5/2007 | Kimmel et al. | |
| 7,262,511 B2 | 8/2007 | Osako et al. | |
| 7,341,705 B2 | 3/2008 | Schnitter | |
| 7,381,396 B2 | 6/2008 | Thomas et al. | |
| 7,419,926 B2 | 9/2008 | Schnitter et al. | |
| 7,483,259 B2 | 1/2009 | Biler | |
| 7,515,396 B2 | 4/2009 | Biler | |
| 7,643,269 B2 | 1/2010 | Kirschbaum | |
| 7,675,736 B2 | 3/2010 | Umemoto et al. | |
| 7,889,509 B2 | 2/2011 | Urashima et al. | |
| 8,134,827 B2 | 3/2012 | Umemoto et al. | |
| 8,379,371 B2 | 2/2013 | Chen et al. | |
| 8,587,927 B2 | 11/2013 | Sugimura | |
| 8,724,294 B2 | 5/2014 | Abe et al. | |
| 8,780,529 B2 | 7/2014 | Aoyama | |
| 8,840,685 B2 | 9/2014 | Chacko et al. | |
| 8,848,342 B2 | 9/2014 | Uher et al. | |
| 9,177,728 B2 | 11/2015 | Aoyama | |
| 9,190,214 B2 | 11/2015 | Chacko et al. | |
| 9,236,192 B2 | 1/2016 | Biler et al. | |
| 9,236,193 B2 | 1/2016 | Tatsuno et al. | |
| 9,583,274 B2 | 2/2017 | Aoyama | |
| 10,622,160 B2 | 4/2020 | Weaver et al. | |
| 10,770,238 B2 | 9/2020 | Djebara et al. | |
| 11,222,755 B2 | 1/2022 | Tezuka | |
| 11,404,220 B2 | 8/2022 | Navratil et al. | |
| 2006/0181836 A1 * | 8/2006 | Furuzawa | H01G 9/15 361/523 |
| 2009/0135550 A1 * | 5/2009 | Umemoto | H01G 9/0003 361/523 |
| 2011/0026191 A1 | 2/2011 | Chacko et al. | |
| 2015/0049419 A1 * | 2/2015 | Biler | H01G 9/012 361/536 |
| 2015/0213961 A1 * | 7/2015 | Liu | H01G 9/012 29/25.03 |
| 2019/0392995 A1 | 12/2019 | Navratil et al. | |
| 2019/0392998 A1 | 12/2019 | Petrzilek et al. | |
| 2022/0230815 A1 | 7/2022 | Petrzilek et al. | |

FOREIGN PATENT DOCUMENTS

| | | |
|---|---|---|
| JP | H 04216608 A | 8/1992 |
| JP | H 0878292 A | 3/1996 |
| JP | 2003264129 A | 9/2003 |
| JP | 2005286250 A | 10/2005 |
| JP | 2007287841 A | 11/2007 |
| JP | 2009-130166 A | 6/2009 |
| JP | 2009182157 A | 8/2009 |
| JP | 2009246138 A | 10/2009 |
| JP | 2013-501359 A | 1/2013 |
| JP | 2018-101709 A | 6/2018 |
| JP | 2018142668 A | 9/2018 |

OTHER PUBLICATIONS

International Search Report issued in PCT/JP2020/017282, Jul. 14, 2020 (2 pages).

Chinese Search Report dated Sep. 22, 2022, 3 pages.

* cited by examiner

SOLID ELECTROLYTIC CAPACITOR

TECHNICAL FIELD

The present disclosure relates to a solid electrolytic capacitor.

BACKGROUND ART

Patent Document 1 discloses an example of a conventional solid electrolytic capacitor. A solid electrolytic capacitor is formed by laminating a dielectric layer, a solid electrolyte layer, and a cathode layer on the outer surface of a porous sintered body and the inner surfaces of pores, and covering the laminate with sealing resin. In the solid electrolytic capacitor, a crack may form between the solid electrolyte layer and the cathode layer due to a change in temperature caused by reflow soldering performed at the time of mounting. If a cracked forms, the solid electrolyte layer may deteriorate due to temperature and humidity, and the equivalent series resistance (ESR) may increase. Also, if the pores of the porous sintered body contain a large amount of moisture, the moisture expands due to heat generated in reflow soldering, and if the sealing resin is thin, the sealing resin may crack. If a crack forms in the sealing resin, moisture can easily enter from the outside, and deterioration of the solid electrolyte layer progresses.

PRIOR ART DOCUMENTS

Patent Document
Patent Document 1: JP-A-2018-101709

SUMMARY OF THE INVENTION

Problem to be Solved by the Invention

In light of the above-described circumstances, the present disclosure is directed at providing a solid electrolytic capacitor that can suppress deterioration of a solid electrolyte layer.

Means for Solving the Problem

A solid electrolytic capacitor provided by this disclosure includes: a porous sintered body made of a valve metal; an anode wire that has a portion extending inside the porous sintered body, and that protrudes from the porous sintered body; a dielectric layer formed on the porous sintered body; a solid electrolyte layer formed on the dielectric layer; a cathode layer formed on the solid electrolyte layer; and a protective film having at least a portion formed on the cathode layer, in which the protective film has a glass transition point of 180° C. or lower.

Advantages of the Invention

According to the above-described configuration, the glass transition point of the protective film is 180° C. or lower and is sufficiently lower than the temperature during reflow soldering. Therefore, the protective film softens during reflow soldering, thus relieving stress that forms a crack between the solid electrolyte layer and the cathode layer. Accordingly, the formation of a crack between the solid electrolyte layer and the cathode layer is suppressed, and thus deterioration of the solid electrolyte layer is suppressed. Also, when a crack forms in the sealing resin during reflow soldering, the softened protective film can flow into the crack and fill the cracked portion. This inhibits moisture from entering through the crack, and thus suppresses deterioration of the solid electrolyte layer.

Other features and advantages of the present invention will become more apparent from the detailed description given below with reference to the attached drawings.

MODE FOR CARRYING OUT THE INVENTION

Figure 1:
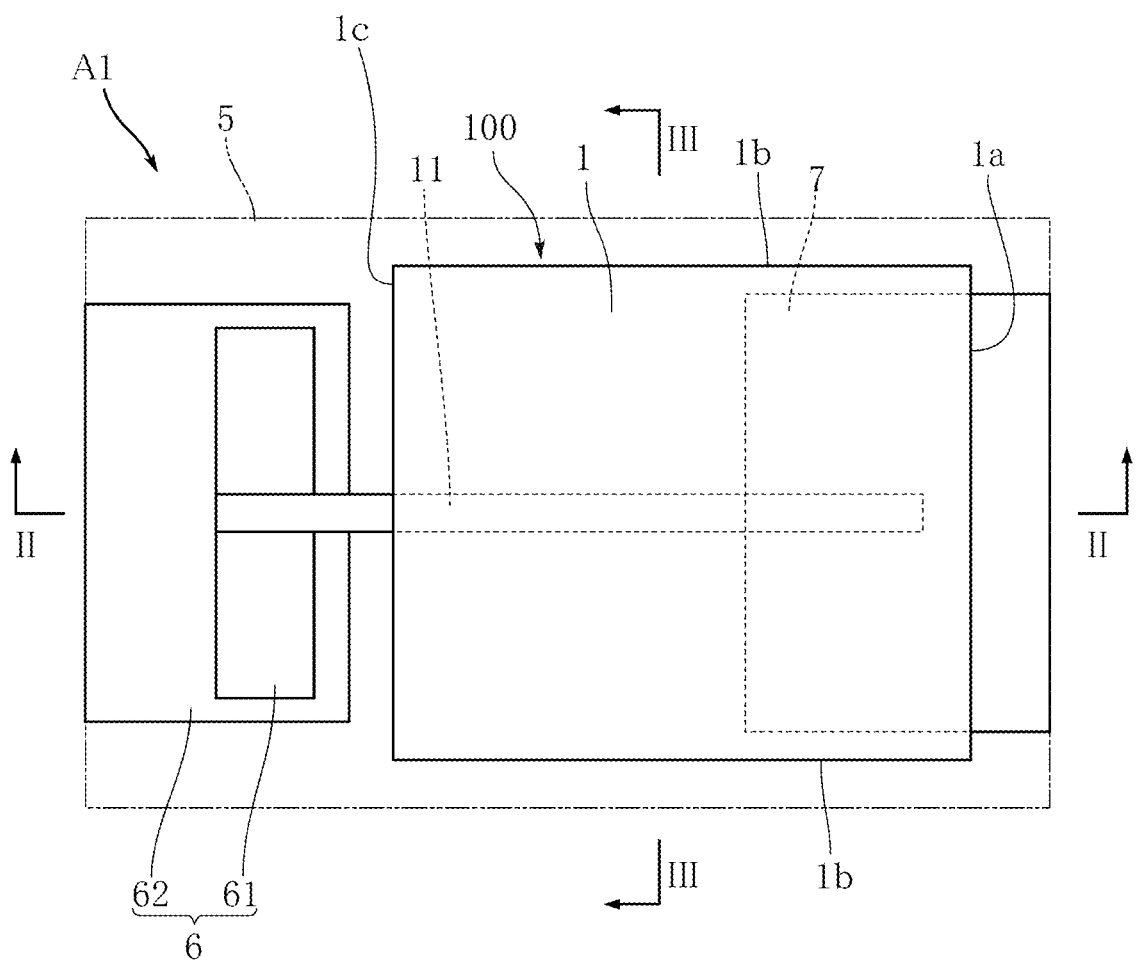
FIG. 1 is a plan view showing a solid electrolytic capacitor according to a first embodiment.

Hereinafter, a preferable embodiment of this disclosure will be specifically described with reference to the drawings.

FIGS. 1 to 4 show a solid electrolytic capacitor according to a first embodiment of this disclosure. A solid electrolytic capacitor A1 includes a capacitor element 100, an anode conducting member 6, a cathode conducting member 7, a protective film 8, and a sealing resin 5. In the description given below, a direction extending along one side of the solid electrolytic capacitor A1 in a plan view (a direction from left to right in FIG. 1) is regarded as the x-direction, a direction extending along another side (a direction from down to top in FIG. 1) is regarded as the y-direction, and the thickness direction of the solid electrolytic capacitor A1 (a direction from down to top in FIGS. 2 and 3) is regarded as the z-direction in these diagrams. An example of the size of the solid electrolytic capacitor A1 includes a size such that the x-direction dimension is about 3.2 mm, the y-direction dimension is about 1.6 mm, and the z-direction dimension is about 1.2 mm. Note that there are no particular limitations on these sizes.

Figure 2:
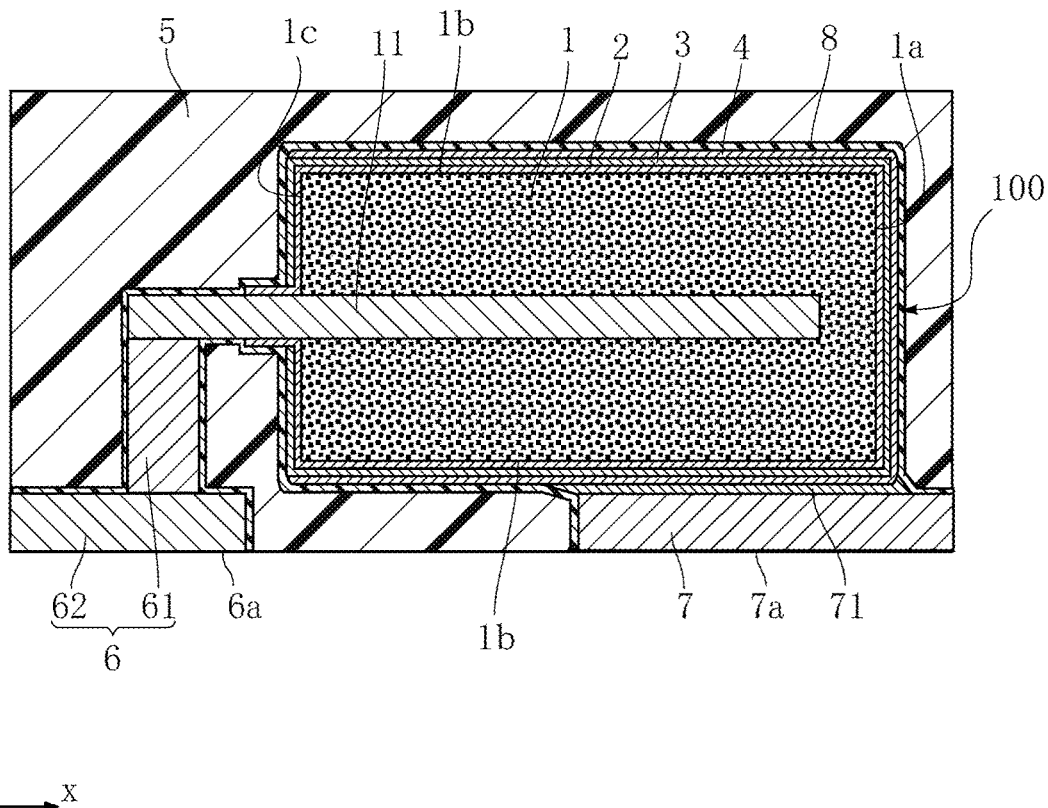
FIG. 2 is a cross-sectional view taken along a line II-II in FIG. 1.
Figure 3:
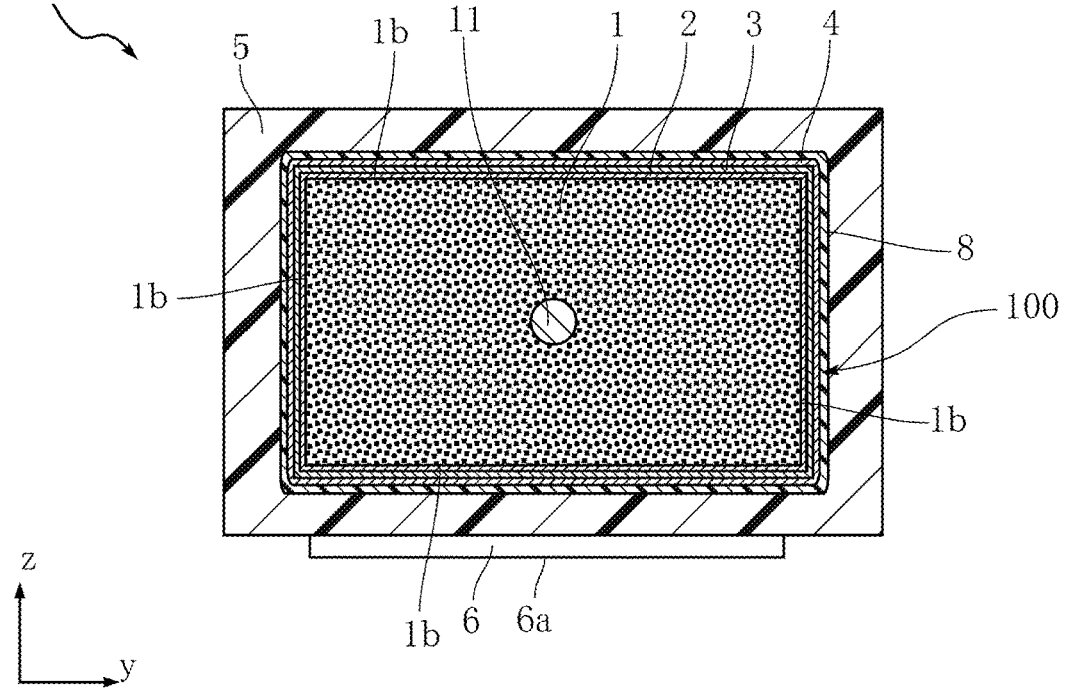
FIG. 3 is a cross-sectional view taken along a line III-III in FIG. 1.
Figure 4:
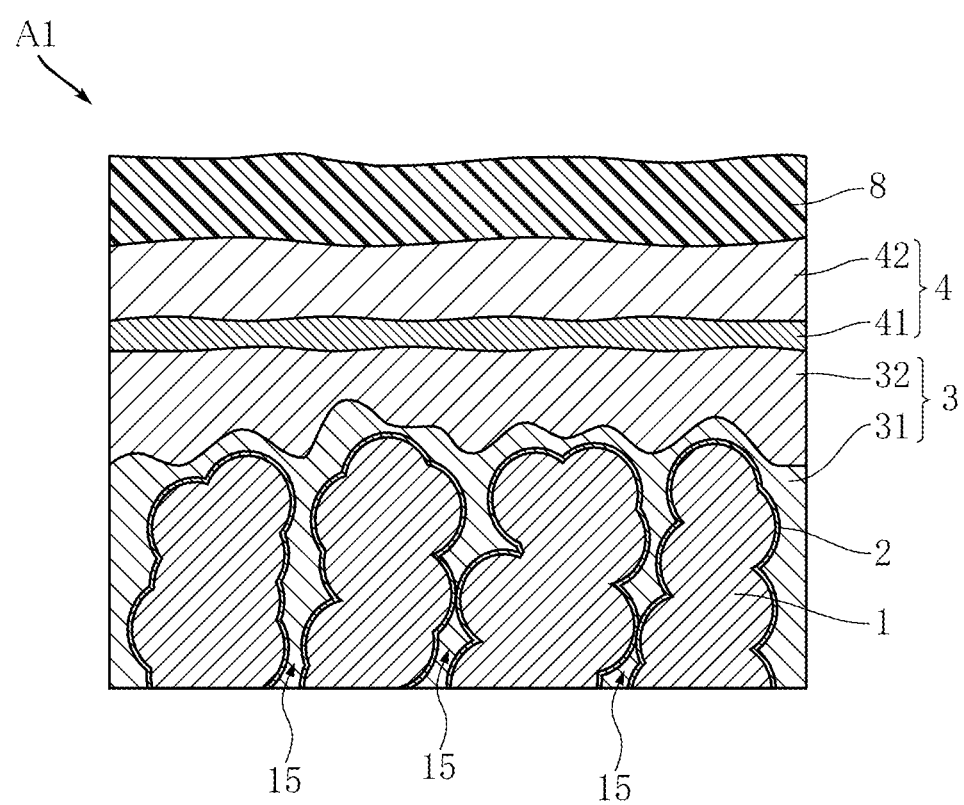
FIG. 4 is an enlarged cross-sectional view showing main portions of the solid electrolytic capacitor shown in FIG. 1.

FIG. 1 is a plan view showing the solid electrolytic capacitor A1. FIG. 1 shows the outer shape of the sealing resin 5 using an imaginary line (two-dot chain line), seen through the sealing resin 5. FIG. 2 is a cross-sectional view taken along a line II-II in FIG. 1. FIG. 3 is a cross-sectional view taken along a line III-III in FIG. 1. FIG. 4 is an enlarged cross-sectional view showing main portions of the solid electrolytic capacitor A1.

The capacitor element 100 includes a porous sintered body 1, an anode wire 11, a dielectric layer 2, a solid electrolyte layer 3, and a cathode layer 4.

The porous sintered body 1 forms the anode for the dielectric layer 2, and is made of Ta or Nb, which is a valve metal, for example. In this embodiment, the porous sintered body 1 has a rectangular parallelepiped shape. As shown in FIG. 4, the porous sintered body 1 has a large number of minute pores 15 inside. The porous sintered body 1 has a face 1a facing one side in the x-direction, a face 1c facing opposite to the face 1a in the x-direction, and four faces 1b that are connected to the faces 1a and 1c. The faces 1a, 1b, and 1c each have a rectangular shape.

A portion of the anode wire 11 extends inside the porous sintered body 1 in the x-direction. The anode wire 11 is made of Ta, Nb, or the like, which is a valve metal, for example. The material of the anode wire 11 is not limited, and is preferably formed of a valve metal that is the same as the valve metal that forms the porous sintered body 1. The anode wire 11 extends inside the porous sintered body 1 in the x-direction at the center of the face 1c of the porous sintered body 1 and protrudes toward the opposite side in the x-direction. That is, the anode wire 11 is disposed to be parallel to the four faces 1b of the porous sintered body 1, is located at the center of the porous sintered body 1 in the z-direction, and is located at the center of the porous sintered body 1 in the y-direction. The length of the portion of the anode wire 11 that extends inside the porous sintered body 1 is about 75% of the x-direction dimension of the porous sintered body 1. A cross-section of the anode wire 11 that is parallel to the face 1c has a circular shape.

The dielectric layer 2 is laminated on the surface of the porous sintered body 1. The dielectric layer 2 can also be laminated on the surface of a portion of the anode wire 11. As shown in FIG. 4, the porous sintered body 1 has a structure having a large number of pores 15, and the surface covered by the dielectric layer 2 includes not only the externally visible surfaces (the faces 1a, 1b, and 1c) of the porous sintered body 1, but also the inner surfaces of the pores 15. Although the dielectric layer 2 is illustrated as a layer that covers the porous sintered body 1 from the outside for convenience of understanding in FIGS. 2 and 3, practically, the dielectric layer 2 is formed over the outer surface of the porous sintered body 1 and inside the pores 15. In general, the dielectric layer 2 is made of an oxide of a valve metal, and is made of $Ta_2O_5$ (tantalum pentoxide), $Nb_2O_5$ (niobium pentoxide), or the like, for example.

The solid electrolyte layer 3 covers the dielectric layer 2. It is sufficient that the solid electrolyte layer 3 can electrically constitute a capacitor together with the porous sintered body 1 with the dielectric layer 2 arranged therebetween. As shown in FIG. 4, the solid electrolyte layer 3 is constituted by an inner layer 31 and an outer layer 32. The inner layer 31 covers the portions of the dielectric layer 2 that cover the inner surfaces of the pores 15 of the porous sintered body 1, and the pores 15 of the porous sintered body 1 are filled with the inner layer 31. The inner layer 31 is made of a conductive polymer, for example. The outer layer 32 is laminated on the inner layer 31 and covers the inner layer 31 on the outside of the porous sintered body 1. In this embodiment, the outer layer 32 is made of a conductive polymer. The solid electrolyte layer 3 may be constituted by a single layer made of a conductive polymer.

The cathode layer 4 is a layer that is laminated on the outer layer 32 of the solid electrolyte layer 3 and achieves electrical connection between the solid electrolyte layer 3 and the cathode conducting member 7. The configuration of the cathode layer 4 is not particularly limited as long as it has appropriate conductivity. In this embodiment, the cathode layer 4 is formed so as to cover the face 1a and the four faces 1b of the porous sintered body 1, and is not formed on the face 1c portion of the porous sintered body 1. The cathode layer 4 may be formed so as to cover the face 1c of the porous sintered body 1 as well. As shown in FIG. 4, the cathode layer 4 is constituted by a base layer 41 and an upper layer 42. The base layer 41 is made of graphite, for example, and directly covers the solid electrolyte layer 3. The upper layer 42 is laminated on the base layer 41, and is made of Ag, for example.

The anode conducting member 6 is joined to the anode wire 11, and a portion thereof is exposed from the sealing resin 5. The anode conducting member 6 is made of a Ni—Fe alloy plated with Cu, such as 42 alloy, for example. A portion of the anode conducting member 6 that is exposed from the sealing resin 5 is used as an external anode terminal 6a for surface-mounting the solid electrolytic capacitor A1. In this embodiment, the anode conducting member 6 is constituted by an intermediate portion 61 and an exposed portion 62. The entire intermediate portion 61 is covered by the sealing resin 5, and the intermediate portion 61 is joined to the anode wire 11. The exposed portion 62 is a plate-shaped member, and is joined to the intermediate portion 61. The exposed portion 62 constitutes the external anode terminal 6a as a result of a portion of the exposed portion 62 being exposed from the sealing resin 5.

The cathode conducting member 7 is joined to the cathode layer 4 via a conductive joining member 71 made of Ag or the like, for example, and a portion thereof is exposed from the sealing resin 5. The cathode conducting member 7 is made of a Ni—Fe alloy plated with Cu, such as 42 alloy, for example, and is a plate-shaped member in this embodiment. The face of the cathode conducting member 7 that is exposed from the sealing resin 5 is used as an external cathode terminal 7a for surface-mounting the solid electrolytic capacitor A1. The exposed portion 62 of the anode conducting member 6 and the cathode conducting member 7 originate from lead frames at the time of manufacture.

The sealing resin 5 covers the capacitor element 100, the anode conducting member 6, and the cathode conducting member 7, and is made of an epoxy resin, for example.

The protective film 8 is arranged between the capacitor element 100 and the anode conducting member 6, and between the cathode conducting member 7 and the sealing resin 5. The protective film 8 is formed on the cathode layer 4 over the majority of the capacitor element 100. In this embodiment, in the capacitor element 100, the protective film 8 covers all the faces other than a portion of the anode wire 11 that is joined to the anode conducting member 6 and a portion of the cathode layer 4 that is joined to the cathode conducting member 7.

The protective film 8 is made of a polymer containing a fluorine and is waterproof. Therefore, it is possible to suppress an excessive increase in the amount of moisture contained in the pores 15 of the porous sintered body 1. A polymer containing Si is excessively waterproof, and thus the amount of moisture contained in the pores 15 of the porous sintered body 1 is excessively reduced. It is desired that in the solid electrolyte capacitor, the pores 15 contain a smaller amount of moisture during reflow soldering, whereas when the solid electrolyte capacitor is practically used after reflow soldering, the pores 15 need to contain a predetermined amount of moisture. Thus, a polymer that does not contain Si is adopted for the protective film 8 in this embodiment. In this embodiment, the protective film 8 is made of a polymer having a perfluoroalkyl group having carbon atoms ($C_6F_{13}$-R) and having a thermal decomposition temperature of 200° C. to 300° C. The protective film 8 is not limited to this. The protective film 8 has a thickness of about 0.5 μm in this embodiment. The thickness of the protective film 8 is not limited to this, and is desirably 0.01 to 5 μm, and more desirably 0.1 to 2 μm.

The protective film 8 has a glass transition point of 35° C. to 50° C. The glass transition point of the protective film 8 is not limited to this, and need only be lower than or equal to the glass transition point of the cathode layer 4 or the sealing resin 5. Because the glass transition point of the sealing resin 5 is about 110° C. to 180° C., the glass transition point of the protective film 8 need only be 180° C. or lower, and desirably 110° C. or lower. The glass transition point of the protective film 8 is more preferably 35° C. to 85° C., and even more preferably 35° C. to 50° C. The glass transition point in this disclosure was detected through DSC (Differential Scanning calorimetry). The glass transition point may be detected using another method.

Figure 5:
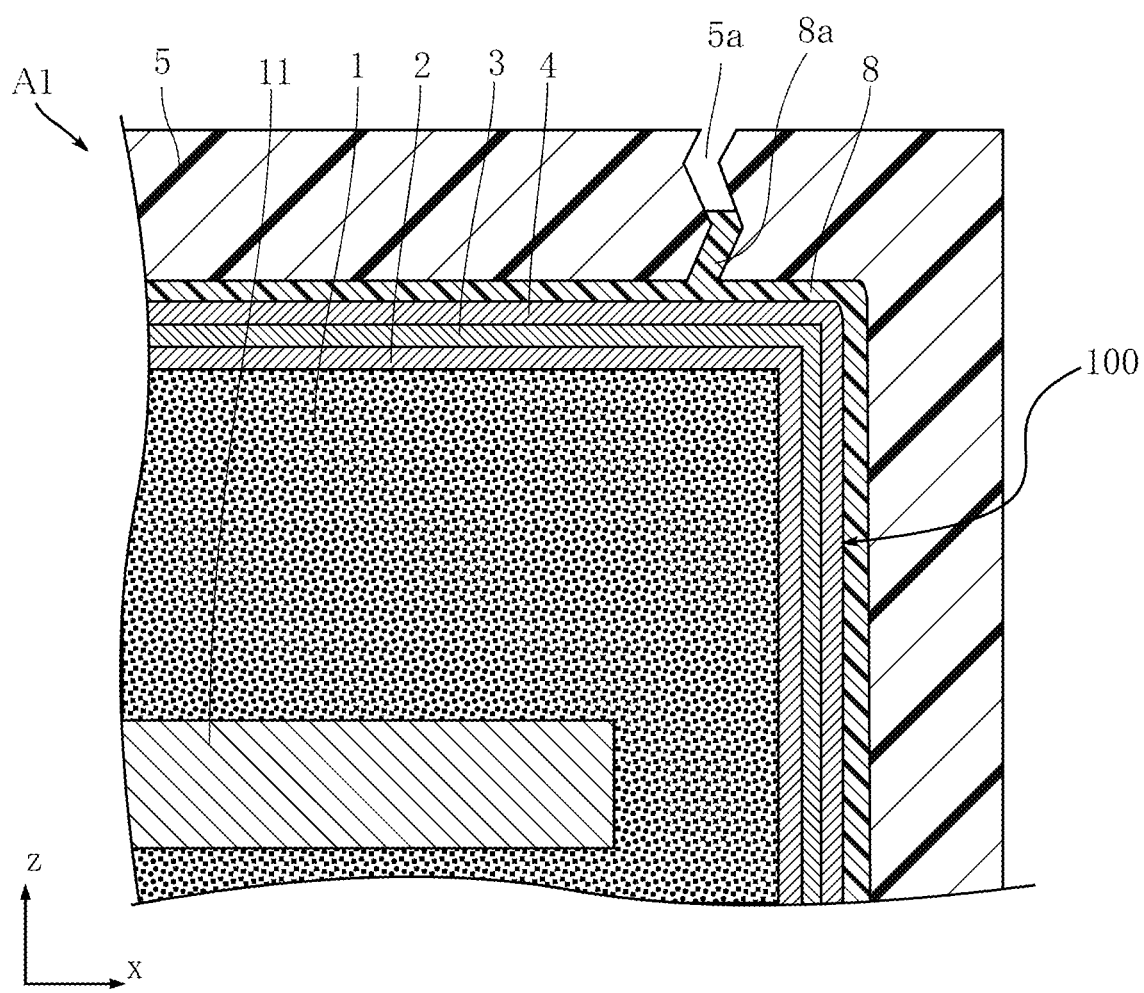
FIG. 5 is an enlarged cross-sectional view showing the solid electrolytic capacitor shown in FIG. 1, illustrating a state where a crack forms in sealing resin during reflow soldering.

FIG. 5 is an enlarged cross-sectional view of the solid electrolytic capacitor A1, showing a state where a crack 5a forms in the sealing resin 5 during reflow soldering. The sealing resin 5 is formed thin due to demand for size reduction. Because the protective film 8 is not completely waterproof, the pores 15 of the porous sintered body 1 contain a certain amount of moisture. Thus, due to heat generated in reflow soldering, the moisture may expand and the crack 5a may form in the sealing resin 5. Because the temperature increases to about 260° C. in reflow soldering, for example, the temperature inside the solid electrolytic capacitor A1 exceeds the glass transition point of the protective film 8. Therefore, the viscosity of the protective film 8 decreases and the flowability thereof increases. Accordingly, as shown in FIG. 5, a portion 8a of the softened protective film 8 flows into the crack 5a in the sealing resin 5 and fills the crack 5a.

Figure 6:
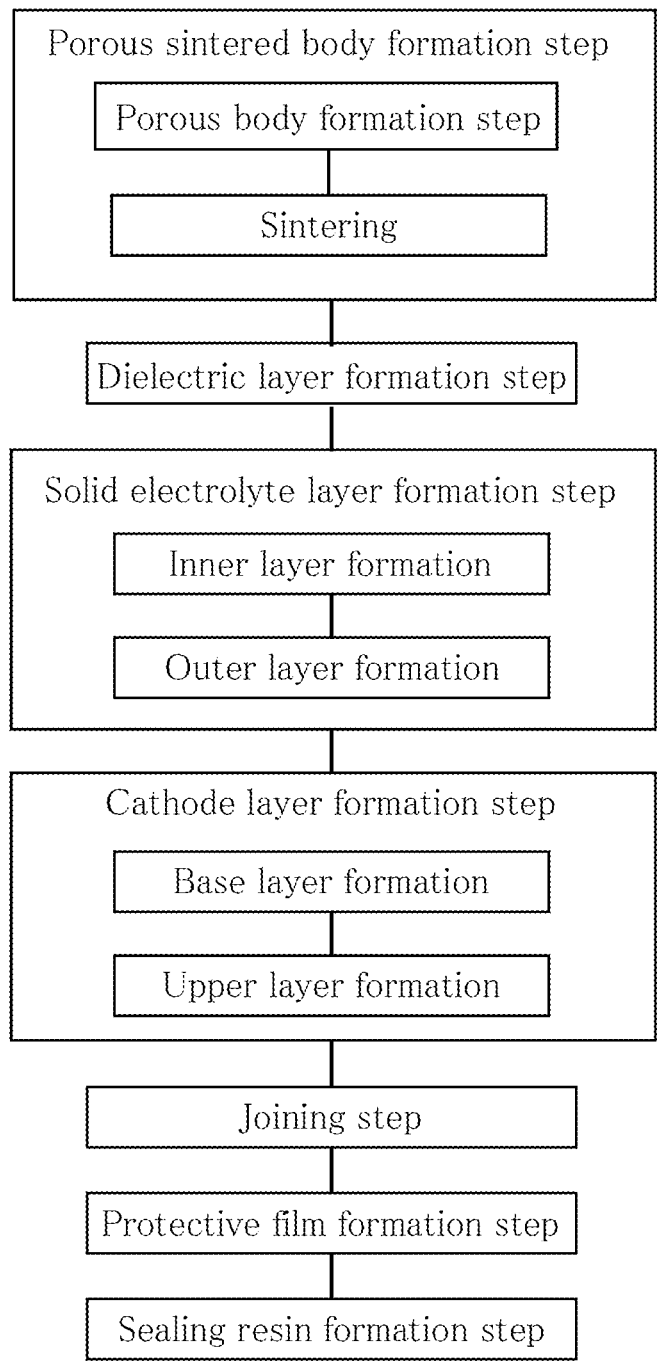
FIG. 6 is a flowchart showing an example of a method for manufacturing the solid electrolytic capacitor shown in FIG. 1.

An example of a method for manufacturing the solid electrolytic capacitor A1 will be described below with reference to FIGS. 6 to 10. FIG. 6 is a diagram showing a flow of the method for manufacturing the solid electrolytic capacitor A1. FIGS. 7 to 10 are all cross-sectional views showing steps according to the method for manufacturing the solid electrolytic capacitor A1, and correspond to FIG. 2.

As shown in FIG. 6, first, the porous sintered body 1 is formed (a porous sintered body formation step). In this step, first, a porous body is formed (a porous body formation step).

Figure 7:
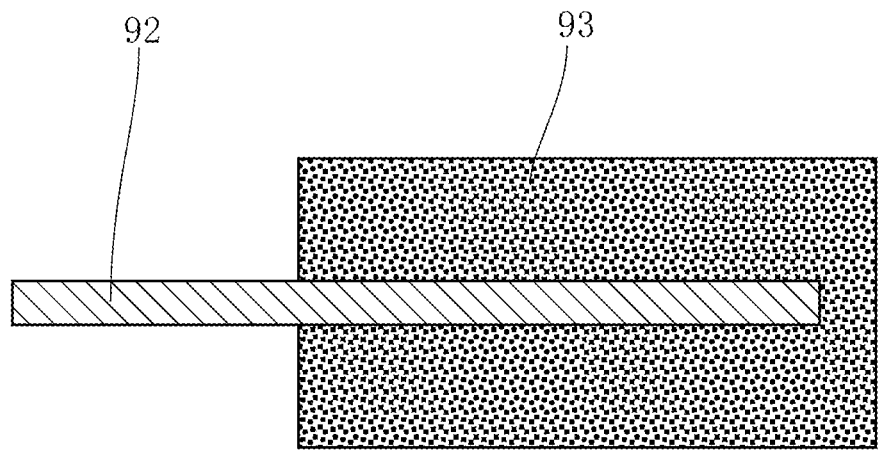
FIG. 7 is a cross-sectional view showing one of the steps for manufacturing the solid electrolytic capacitor shown in FIG. 1.
Figure 7:
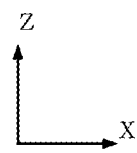
Figure 8:
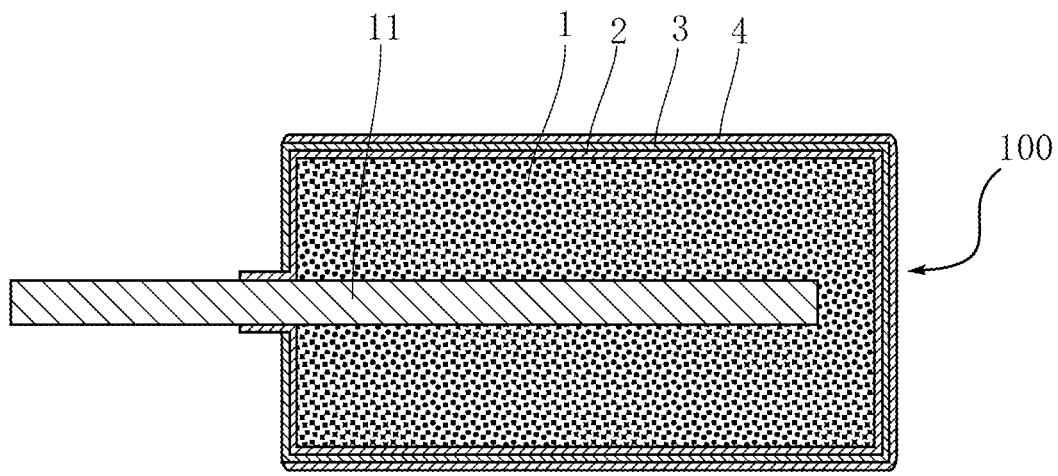
FIG. 8 is a cross-sectional view showing one of the steps for manufacturing the solid electrolytic capacitor shown in FIG. 1.
Figure 8:
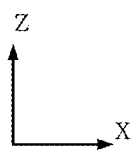

In the porous body formation step, the space in a mold is filled with a fine powder of a valve metal such as Ta or Nb, for example. Then, the leading end portion of a wire material 92, which will form the anode wire 11, is inserted into the fine powder that fills the space. Then, the mold applies pressure to the fine powder filled therein. Accordingly, the fine powder is compressed, and the porous body 93 is press-molded. Then, as shown in FIG. 7, the wire material 92 is cut at a predetermined position away from the porous body 93, and the porous body 93 is removed. As described above, the porous body 93 into which the wire material 92 has been inserted is obtained.

Then, sintering is performed on the porous body 93 and the wire material 92. The fine powder of the valve metal is sintered through this sintering, and the porous sintered body 1 having a large number of pores 15 and the anode wire 11 are formed (sintering). At this time, the outer shape of the porous sintered body 1 is smaller than the outer shape of the porous body 93 due to shrinkage caused by the sintering. In consideration of this shrinkage, the porous body 93 is molded such that the porous sintered body 1 and the anode wire 11 have predetermined dimensions.

Then, the dielectric layer 2 is formed (a dielectric layer formation step). The porous sintered body 1 is immersed in a chemical conversion solution of an aqueous phosphoric acid solution while the porous sintered body 1 is supported by the anode wire 11. Then, anodic oxidation treatment is performed on the porous sintered body 1 in this chemical conversion solution. Accordingly, the dielectric layer 2 made of $Ta_2O_5$, $Nb_2O_5$, or the like is formed, for example, so as to cover the outer surface and the inner surface of the porous sintered body 1.

Then, the solid electrolyte layer 3 is formed (a solid electrolyte layer formation step). In the step of forming the solid electrolyte layer 3, first, the inner layer 31 is formed (inner layer formation). First, a polymer dispersion product and a solvent are mixed together. The polymer dispersion product is conductive polymer particles obtained through a polymerization reaction in advance, and a polymer or a copolymer consisting of one or two types selected from polypyrrole, polythiophene, poly(N-methylpyrrole), poly(3-methylthiophene), poly(3-methoxythiophene), and poly(3,4-ethylenedioxythiophene) is preferably used from the viewpoint of electrical conductivity. Furthermore, polypyrrole and poly(3,4-ethylenedioxythiophene) are more preferable from the viewpoint of being able to improve conductivity and increase heat resistance. The solvent allows uniform dispersion of the polymer dispersion product, and water, ethanol, an organic solvent, or the like can be adopted as appropriate, for example. As a result, a dispersion product solution can be obtained. Then, the porous sintered body 1 provided with the dielectric layer 2 is immersed in the dispersion product solution and then pulled out. The solvent is then eliminated by drying the dispersion product solution, for example. As a result, the inner layer 31 made of a conductive polymer is formed.

Then, the outer layer 32 is formed (outer layer formation). The porous sintered body 1 provided with the inner layer 31 is immersed in a known oxidizing agent and monomer solution, pulled out, and dried. This allows a chemical polymerization reaction to occur. Also, cleaning and re-chemical conversion treatment are performed as needed. As a result, the outer layer 32 made of a conductive polymer is formed. Alternatively, it is possible to perform electrolytic polymerization in which the outer layer 32 made of a conductive polymer is formed by applying an electrolyte solution containing a monomer and a dopant and applying a current.

The cathode layer 4 is then formed (a cathode layer formation step). First, the base layer 41 is formed (base layer formation). The base layer 41 is formed by immersing the porous sintered body 1 in a solution of graphite and an organic solvent, pulling the porous sintered body 1 out, and drying or firing the porous sintered body 1, for example. Then, the upper layer 42 is formed (upper layer formation). The upper layer 42 is formed by immersing the porous sintered body 1 in a solution of Ag filler and an organic solvent, pulling the porous sintered body 1 out, and drying or firing the porous sintered body 1, for example. As a result, the upper layer 42 is formed, and the cathode layer 4 is obtained. As described above, as shown in FIG. 8, the capacitor element 100 is formed.

Figure 9:
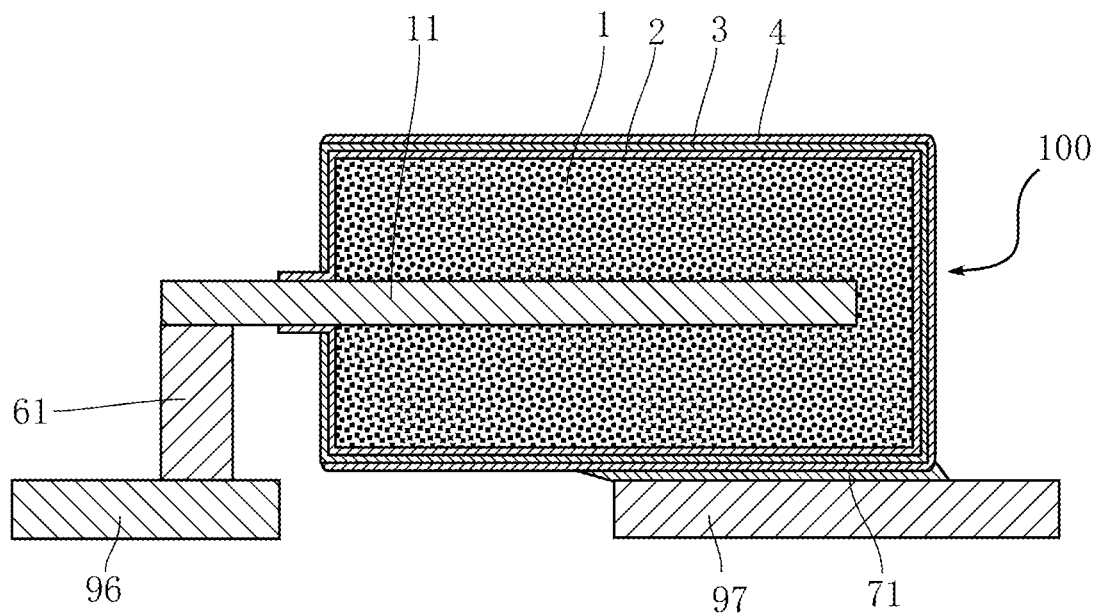
FIG. 9 is a cross-sectional view showing one of the steps for manufacturing the solid electrolytic capacitor shown in FIG. 1.

Materials, which will form the anode conducting member 6 and the cathode conducting member 7, are then joined to the capacitor element 100 (joining step). First, a base material, which will form the intermediate portion 61 of the anode conducting member 6, and the anode wire 11 are welded to each other. Then, this base material is cut to a predetermined size. The base material that has been cut to the predetermined size serves as the intermediate portion 61. Then, the anode wire 11 is cut to a predetermined length. As shown in FIG. 9, the intermediate portion 61 is joined to a lead frame 96 that is to form the exposed portion 62 of the anode conducting member 6, and the capacitor element 100 (the cathode layer 4) is joined to a lead frame 97 that will form the cathode conducting member 7. The lead frame 97 and the cathode layer 4 are joined by a conductive joining material 71 such as silver paste.

Figure 10:
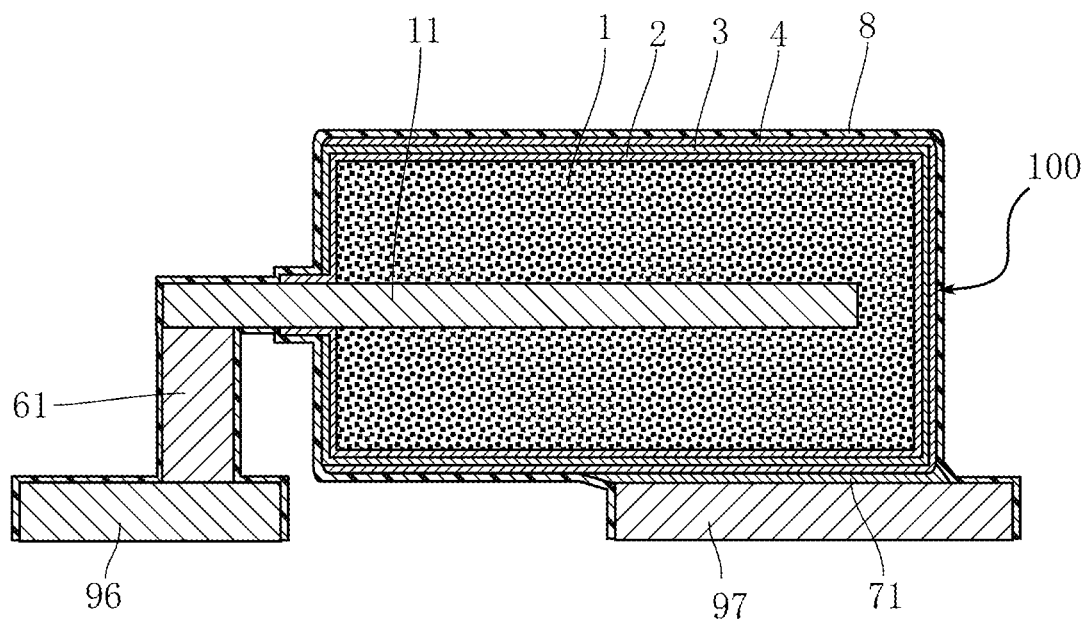
FIG. 10 is a cross-sectional view showing one of the steps for manufacturing the solid electrolytic capacitor shown in FIG. 1.

The protective film 8 is then formed (a protective film formation step). The protective film 8 is formed by immersing the capacitor element 100 to which the lead frames 96 and 97 and the intermediate portion 61 are joined in a dispersion product solution in which a polymer dispersion product containing fluorine and a solvent are mixed together, pulling the capacitor element 100 out, and drying or firing the capacitor element 100. As a result, as shown in FIG. 10, the protective film 8 is formed on the capacitor element 100, the lead frames 96 and 97, and the intermediate portion 61. The protective film 8 may be formed by applying a dispersion product solution through spraying, and then performing drying or firing.

The sealing resin 5 is then formed through transfer molding or the like, for example (a sealing resin formation step). Unnecessary portions of the lead frames 96 and 97 are then cut and removed. The solid electrolytic capacitor A1 shown in FIGS. 1 to 4 can be obtained through the above-described steps.

The following describes effects of the solid electrolytic capacitor A1.

According to this embodiment, the glass transition point of the protective film 8 is 40° C. to 50° C. and is sufficiently lower than the temperature during reflow soldering. Therefore, the protective film 8 that is in contact with the cathode layer 4 softens during reflow soldering, thus relieving stress that forms a crack between the solid electrolyte layer 3 and the cathode layer 4. Accordingly, the formation of a crack between the solid electrolyte layer 3 and the cathode layer 4 is suppressed. Therefore, deterioration of the solid electrolyte layer 3 attributed to a crack between the solid electrolyte layer 3 and the cathode layer 4 is suppressed. Also, if a crack 5a forms in the sealing resin 5 during reflow soldering, a portion 8a of the softened protective film 8 can flow into the crack 5a and fill the crack 5a (see FIG. 5). This inhibits moisture from entering through the crack 5a, and thus suppresses deterioration of the solid electrolyte layer 3.

According to this embodiment, the protective film 8 that is made of a polymer that contains fluorine and does not contain Si covers the capacitor element 100. The protective film 8 is waterproof to a certain extent. Therefore, it is possible to inhibit moisture from entering a crack formed between the solid electrolyte layer 3 and the cathode layer 4, compared to the case where the protective film 8 is not formed. This suppresses deterioration of the solid electrolyte layer 3. Also, the amount of moisture contained in the pores 15 of the porous sintered body 1 is suppressed, compared to the case where the protective film 8 is not formed. This suppresses the formation of the crack 5a in the sealing resin 5 caused by expansion of moisture during reflow soldering. Also, because the protective film 8 does not contain Si, it is possible to suppress an excessive reduction in the amount of moisture contained in the pores 15 of the porous sintered body 1.

Although the case where the protective film 8 is made of a polymer that contains fluorine and does not contain Si has been described in this embodiment, this disclosure is not limited to this. The protective film 8 may have another composition as long as it has a glass transition point of 180° C. or lower. Even in this case, the protective film 8 softens during reflow soldering, thus relieving stress that forms a crack between the solid electrolyte layer 3 and the cathode layer 4, and thus it is possible to suppress the formation of a crack between the solid electrolyte layer 3 and the cathode layer 4. Therefore, deterioration of the solid electrolyte layer 3 attributed to a crack between the solid electrolyte layer 3 and the cathode layer 4 is suppressed. Also, if a crack 5a forms in the sealing resin 5 during reflow soldering, a portion 8a of the softened protective film 8 can flow into the crack 5a and fill the crack 5a (see FIG. 5). This inhibits moisture from entering through the crack 5a, and thus suppresses deterioration of the solid electrolyte layer 3.

FIGS. 11 to 16 show another embodiment of this disclosure. In these drawings, the same reference numerals as the above-described embodiment are given to constituent elements that are the same as or similar to the above-described embodiment.

Figure 11:
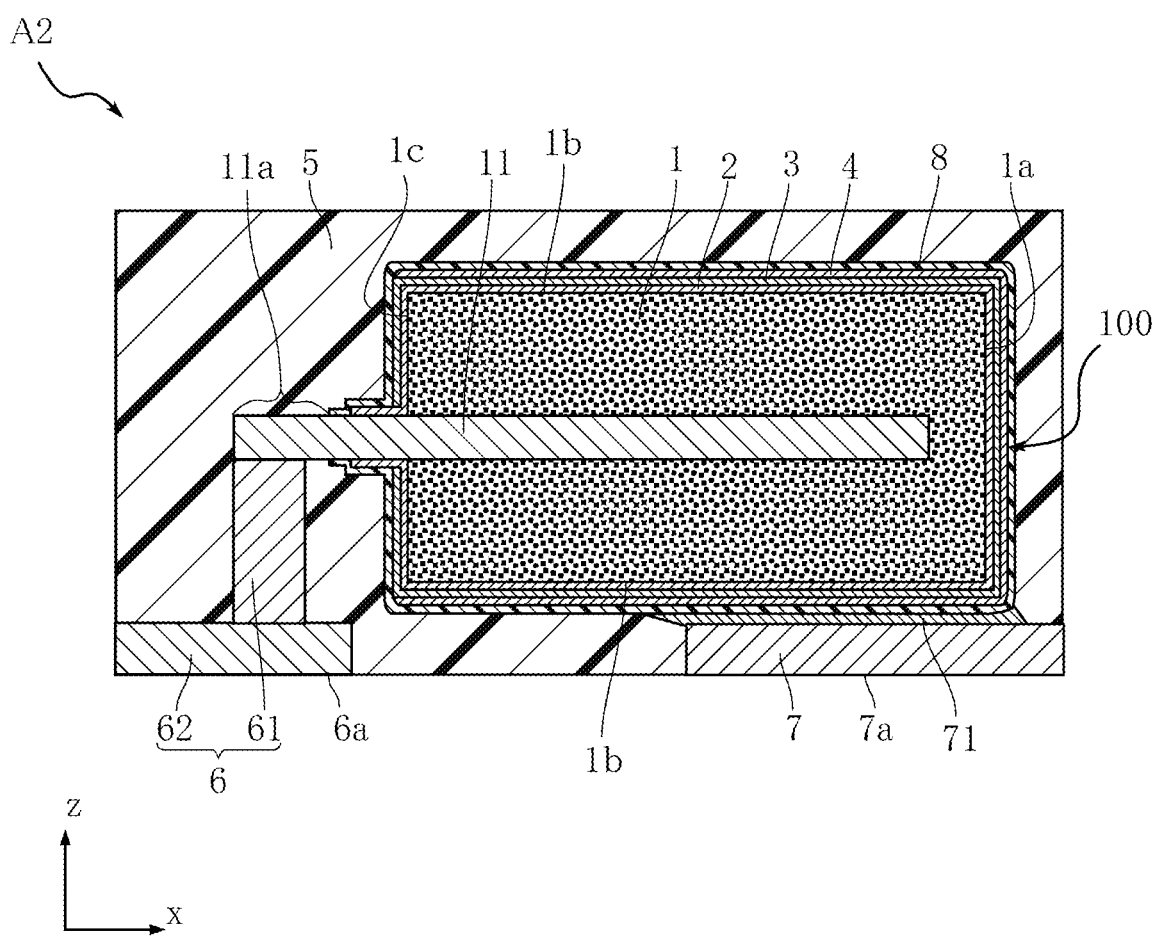
FIG. 11 is a cross-sectional view showing the solid electrolytic capacitor according to a second embodiment.

FIG. 11 is a cross-sectional view showing a solid electrolytic capacitor according to a second embodiment, and corresponds to FIG. 2. A solid electrolytic capacitor A2 according to this embodiment is different from that in the above-described first embodiment in that the protective film 8 covers the capacitor element 100 but does not cover the anode conducting member 6 and the cathode conducting member 7.

In this embodiment, the protective film 8 covers the majority of the capacitor element 100. Specifically, the protective film 8 covers the entire porous sintered body 1, and a portion of the anode wire 11 that protrudes from the porous sintered body 1 and is adjacent to the porous sintered body 1. A base end portion 11a (an end portion on the opposite side in the x-direction) of the anode wire 11 is not covered by the protective film 8. The base end portion 11a may also be covered by the protective film 8. The protective film 8 is in contact with the cathode layer 4 in a portion overlapping with the face 1a and the four faces 1b of the porous sintered body 1, and is in contact with the solid electrolyte layer 3 in a portion overlapping with the face 1c of the porous sintered body 1. That is, out of the faces of the porous sintered body 1, the protective film 8 is formed on the entirety of the face 1a and the four faces 1b where the cathode layer 4 is formed, and the protective film 8 covers all of the faces of the cathode layer 4. Furthermore, the protective film 8 is also arranged between the capacitor element 100 and the cathode conducting member 7. Although the protective film 8 has insulating properties, if the protective film 8 has a thickness of 1 μm or less, it is possible to achieve practical electrical connection between the cathode layer 4 and the cathode conducting member 7.

Figure 12:
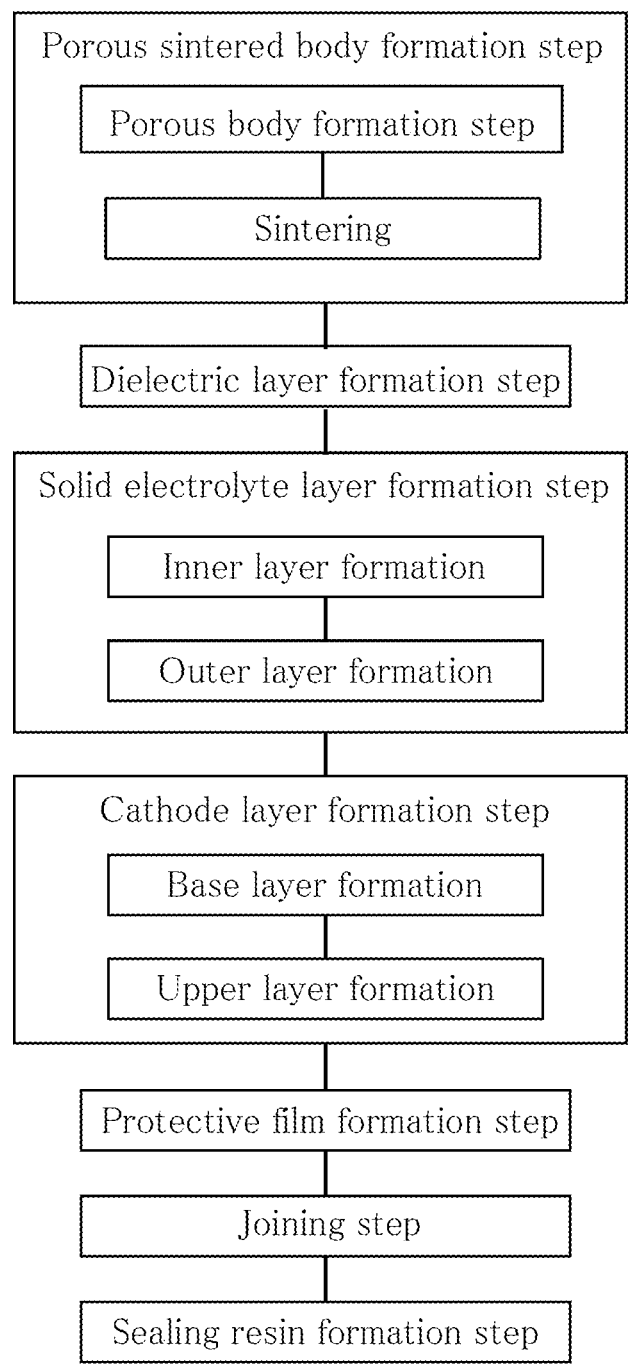
FIG. 12 is a flowchart showing an example of a method for manufacturing the solid electrolytic capacitor shown in FIG. 11.
Figure 13:
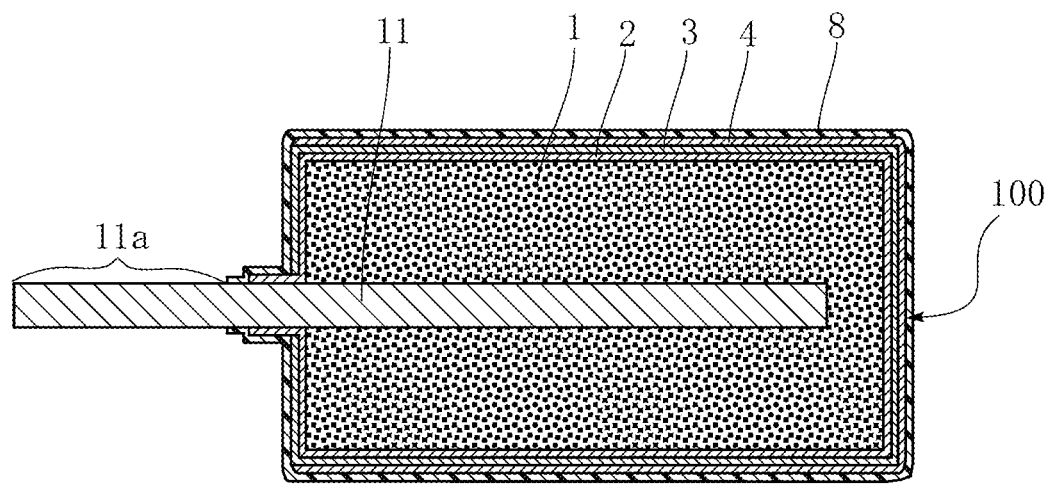
FIG. 13 is a cross-sectional view showing one of the steps for manufacturing the solid electrolytic capacitor shown in FIG. 11.
Figure 14:
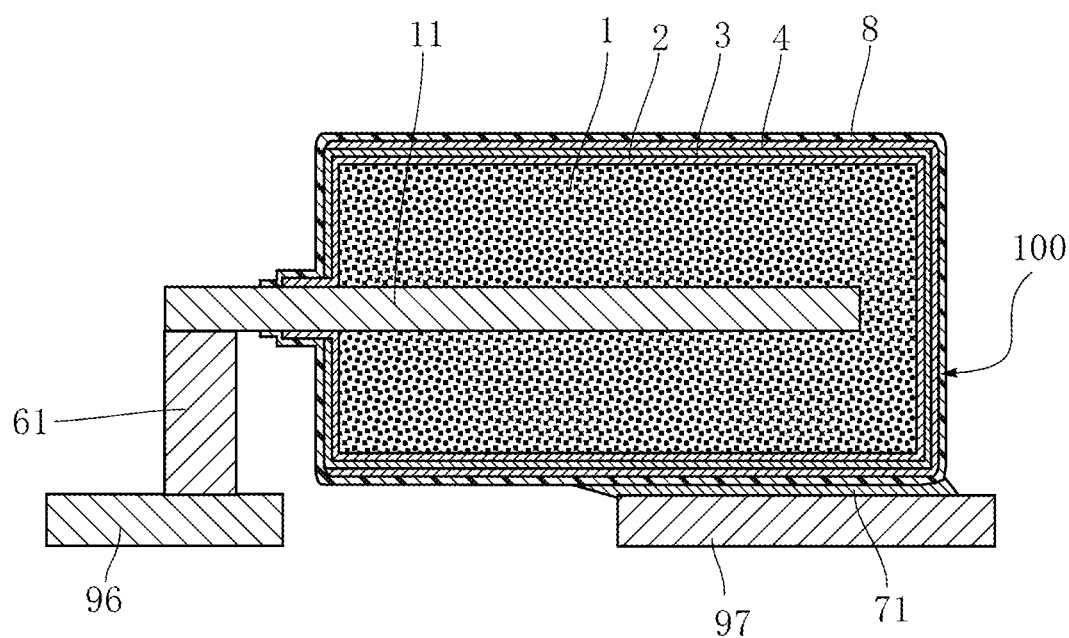
FIG. 14 is a cross-sectional view showing one of the steps for manufacturing the solid electrolytic capacitor shown in FIG. 11.

Next, an example of a method for manufacturing the solid electrolytic capacitor A2 will be described below with reference to FIGS. 12 to 14. The same steps as those in the method for manufacturing the solid electrolytic capacitor A1 according to the first embodiment will not be described. FIG. 12 is a diagram showing a flow of the method for manufacturing the solid electrolytic capacitor A2. FIGS. 13 and 14 are both cross-sectional views showing steps according to the method for manufacturing the solid electrolytic capacitor A2, and correspond to FIG. 2.

As shown in FIG. 12, the method for manufacturing the solid electrolytic capacitor A2 is different from the method for manufacturing the solid electrolytic capacitor A1 according to the first embodiment in that the protective film formation step is carried out before the joining step.

The porous sintered body formation step, the dielectric layer formation step, the solid electrolyte layer formation step, and the cathode layer formation step are the same as those in the manufacturing method according to the first embodiment, and thus these steps will not be described. The capacitor element 100 is formed through these steps.

The protective film 8 is then formed (a protective film formation step). The protective film 8 is formed by immersing the capacitor element 100 in a dispersion product solution in which a polymer dispersion product containing fluorine and a solvent are mixed together, pulling the capacitor element 100 out, and drying or firing the capacitor element 100, for example. When the capacitor element 100 is immersed in the dispersion product solution, the base end portion 11a of the anode wire 11 is not immersed in the dispersion product solution. Accordingly, as shown in FIG. 13, the protective film 8 is formed on a portion of the capacitor element 100 other than the base end portion 11a. The protective film 8 may be formed by applying the dispersion product solution through spraying, and then performing drying or firing. Furthermore, after the protective film 8 is formed on the capacitor element 100, the protective film 8 formed on the region to which the cathode conducting member 7 is joined may be removed.

Materials, which will form the anode conducting member 6 and the cathode conducting member 7, are then joined to the capacitor element 100 provided with the protective film 8 (a joining step). First, a base material, which will form the intermediate portion 61 of the anode conducting member 6, and the anode wire 11 are welded to each other. Then, this base material is cut to a predetermined size. The base material that has been cut to the predetermined size serves as the intermediate portion 61. Then, the anode wire 11 is cut to a predetermined length. As shown in FIG. 14, the intermediate portion 61 is then joined to a lead frame 96 that is to form the exposed portion 62 of the anode conducting member 6, and the capacitor element 100 (the cathode layer 4) is joined to a lead frame 97 that will form the cathode conducting member 7. The lead frame 97 and the cathode layer 4 are joined by a conductive joining material 71 such as silver paste.

The sealing resin 5 is then formed through transfer molding or the like, for example (a sealing resin formation step). Unnecessary portions of the lead frames 96 and 97 are then cut and removed. The solid electrolytic capacitor A2 shown in FIG. 11 can be obtained through the above-described steps.

In this embodiment as well, the protective film 8 is formed so as to cover the capacitor element 100 and be in contact with the cathode layer 4. Therefore, the protective film 8 softens during reflow soldering, thus relieving stress that forms a crack between the solid electrolyte layer 3 and the cathode layer 4. Accordingly, the formation of a crack between the solid electrolyte layer 3 and the cathode layer 4 is suppressed. Therefore, deterioration of the solid electrolyte layer 3 attributed to a crack between the solid electrolyte layer 3 and the cathode layer 4 is suppressed. Also, if a crack 5a forms in the sealing resin 5 during reflow soldering, a portion 8a of the softened protective film 8 can flow into the crack 5a and fill the crack 5a (see FIG. 5). This inhibits moisture from entering through the crack 5a, and thus suppresses deterioration of the solid electrolyte layer 3.

The protective film 8 is also waterproof in this embodiment. Therefore, it is possible to inhibit moisture from entering a crack that has formed between the solid electrolyte layer 3 and the cathode layer 4, compared to the case where the protective film 8 is not formed. This suppresses deterioration of the solid electrolyte layer 3. Also, the amount of moisture contained in the pores 15 of the porous sintered body 1 is suppressed, compared to the case where the protective film 8 is not formed. This suppresses the formation of the crack 5a in the sealing resin 5 caused by expansion of moisture during reflow soldering. Also, because the protective film 8 does not contain Si, it is possible to suppress an excessive reduction in the amount of moisture contained in the pores 15 of the porous sintered body 1.

Figure 15:
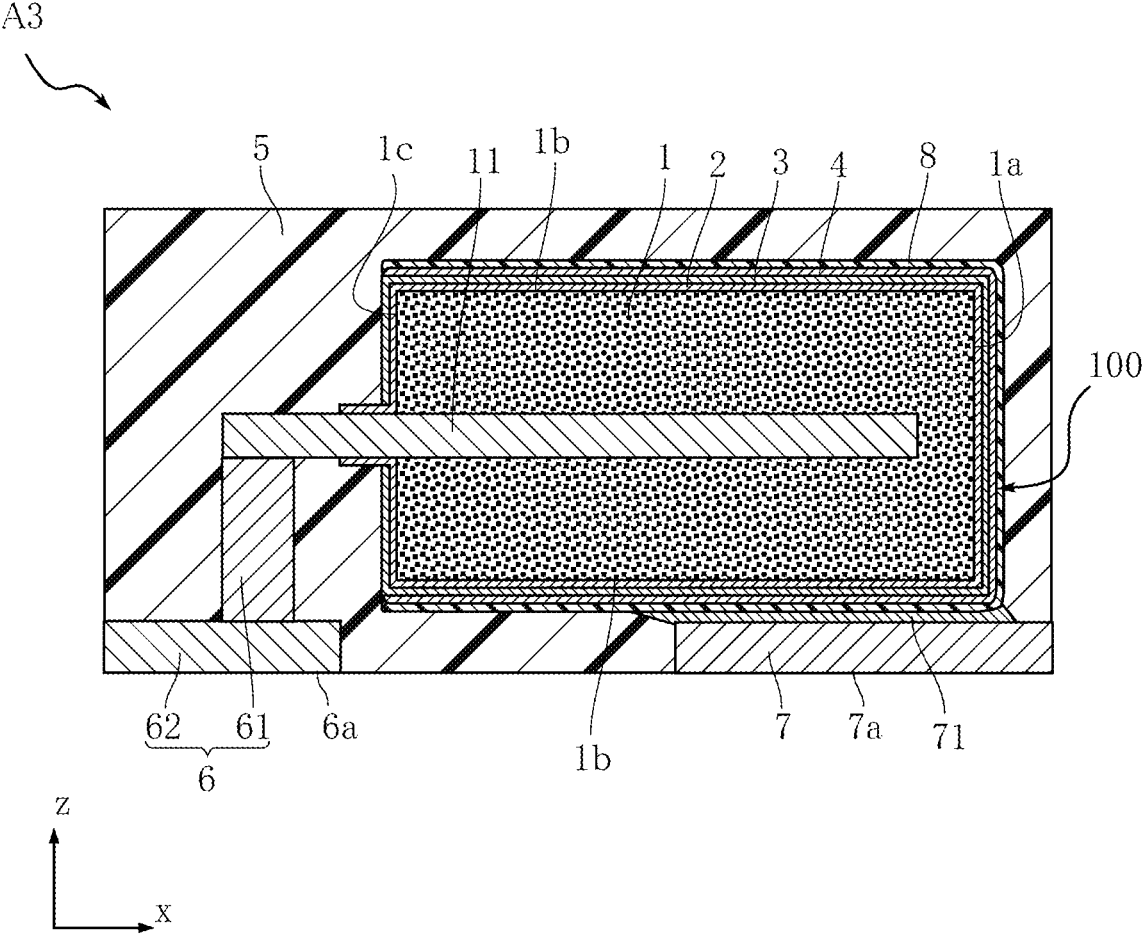
FIG. 15 is a cross-sectional view showing a solid electrolytic capacitor according to a third embodiment.

FIG. 15 is a cross-sectional view showing a solid electrolytic capacitor according to a third embodiment, and corresponds to FIG. 2. A solid electrolytic capacitor A3 according to this embodiment is different from that in the above-described second embodiment in that the protective film 8 is not formed on a surface of the capacitor element 100 that corresponds to the face 1c of the porous sintered body 1.

In this embodiment, the protective film 8 is formed on only faces of the capacitor element 100 that correspond to the face 1a and the four faces 1b of the porous sintered body 1. A face of the capacitor element 100 that corresponds to the face 1c of the porous sintered body 1 and the anode wire 11 are not covered by the protective film 8. The protective film 8 is formed on all of the faces of the porous sintered body 1 on which the cathode layer 4 is formed, and is in contact with the cathode layer 4 on these faces.

The protective film 8 is also formed on all of the faces of the porous sintered body 1 on which the cathode layer 4 is formed, and is in contact with the cathode layer 4 on these faces. The protective film 8 softens during reflow soldering, thus relieving stress that forms a crack between the solid electrolyte layer 3 and the cathode layer 4, and thus it is possible to suppress the formation of a crack between the solid electrolyte layer 3 and the cathode layer 4. Therefore, deterioration of the solid electrolyte layer 3 attributed to a crack between the solid electrolyte layer 3 and the cathode layer 4 is suppressed. Also, the protective film 8 is formed on faces that correspond to the face 1a and the four faces 1b of the porous sintered body 1 where the thin sealing resin 5 is formed and the crack 5a is likely to form. Therefore, if the crack 5a forms in the sealing resin 5 during reflow soldering, a portion 8a of the softened protective film 8 can flow into the crack 5a and fill the crack 5a (see FIG. 5). This inhibits moisture from entering through the crack 5a, and thus suppresses deterioration of the solid electrolyte layer 3. Note that although the protective film 8 is not formed on a face that corresponds to the face 1c of the porous sintered body 1, the protective film 8 that is in contact with this face is thick, and thus the crack 5a is not likely to form.

Because the protective film 8 is also formed on faces that correspond to the face 1a and the four faces 1b of the porous sintered body 1 in this embodiment, it is possible to inhibit moisture from entering a crack that has formed between the solid electrolyte layer 3 and the cathode layer 4, compared to the case where the protective film 8 is not formed. This suppresses deterioration of the solid electrolyte layer 3. Also, the amount of moisture contained in the pores 15 of the porous sintered body 1 is suppressed, compared to the case where the protective film 8 is not formed. This suppresses the formation of the crack 5a in the sealing resin 5 caused by expansion of moisture during reflow soldering. Furthermore, because the protective film 8 does not contain Si, it is possible to suppress an excessive reduction in the amount of moisture contained in the pores 15 of the porous sintered body 1.

Figure 16:
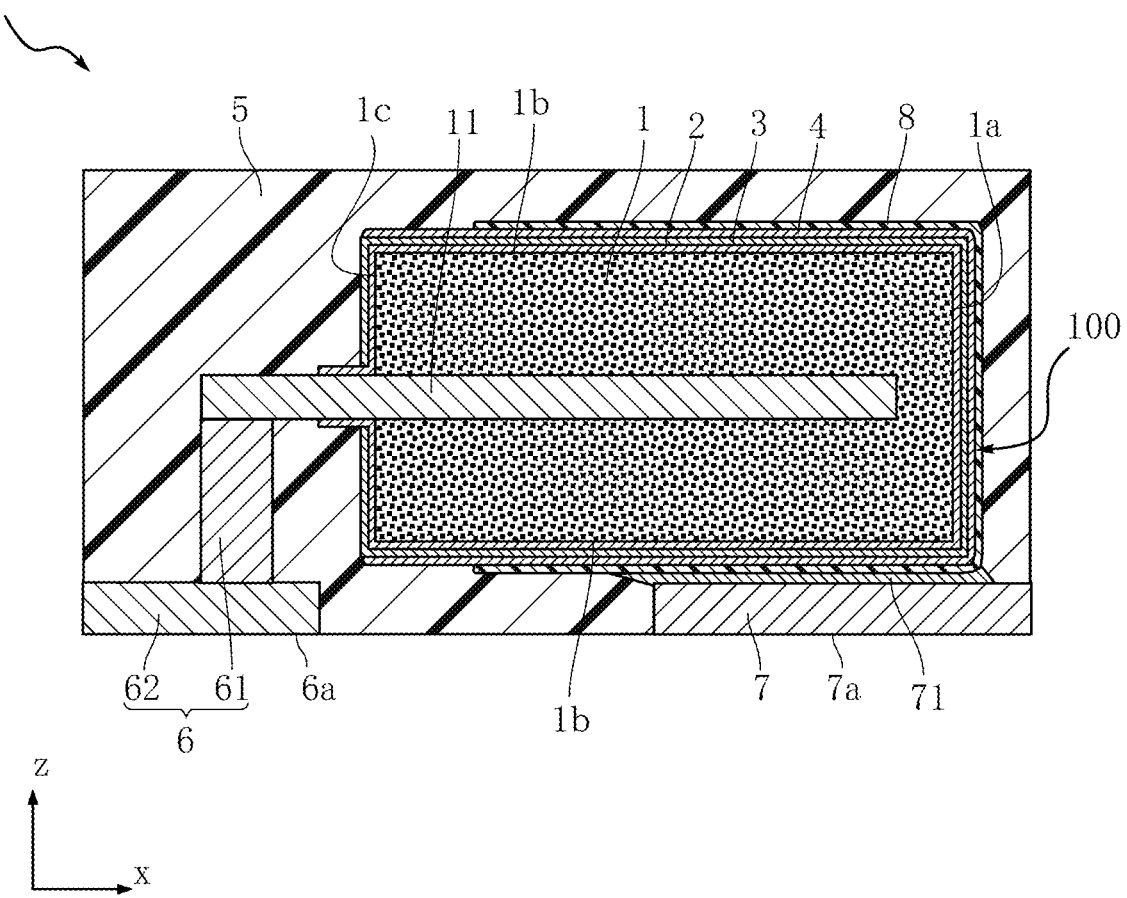
FIG. 16 is a cross-sectional view showing a modified example of the solid electrolytic capacitor according to the third embodiment.

Although the case where the protective film 8 is formed on the entire face that corresponds to the face 1b of the porous sintered body 1 has been described in this embodiment, this disclosure is not limited to this. As shown in FIG. 16, for example, the protective film 8 need not be formed on a portion of a face that corresponds to the face 1b of the porous sintered body 1 (a portion on the opposite side in the x-direction in FIG. 16). Even in this case, the protective film 8 also softens during reflow soldering, thus being able to somewhat relieve stress that forms a crack between the solid electrolyte layer 3 and the cathode layer 4. Also, if the crack 5a forms in a portion of the sealing resin 5 that overlaps with the protective film 8, a portion of the protective film 8 can flow into this crack 5a and fill the crack 5a. Also, it is possible to inhibit moisture from entering a crack that has formed between the solid electrolyte layer 3 and the cathode layer 4, and to suppress the amount of moisture contained in the pores 15 of the porous sintered body 1, compared to the case where the protective film 8 is not formed.

The solid electrolytic capacitor according to this disclosure is not limited to the above-described embodiments. Specific configurations of the portions of the solid electrolytic capacitor according to this disclosure can be freely designed or modified in various ways.

Clause 1.
  A solid electrolytic capacitor including:
    a porous sintered body made of a valve metal;
    an anode wire that has a portion extending inside the porous sintered body, and that protrudes from the porous sintered body;
    a dielectric layer formed on the porous sintered body;
    a solid electrolyte layer formed on the dielectric layer;
    a cathode layer formed on the solid electrolyte layer; and
    a protective film having at least a portion formed on the cathode layer,
    wherein the protective film has a glass transition point of 180° C. or lower.
Clause 2.
  The solid electrolytic capacitor according to Clause 1, wherein the protective film has a glass transition point of 110° C. or lower.
Clause 3.
  The solid electrolytic capacitor according to Clause 2, wherein the protective film has a glass transition point of 35° C. to 85° C.

Clause 4.
  The solid electrolytic capacitor according to Clause 3, wherein the protective film has a glass transition point of 35° C. to 50° C.
Clause 5.
  A solid electrolytic capacitor including:
    a porous sintered body made of a valve metal;
    an anode wire that has a portion extending inside the porous sintered body, and that protrudes from the porous sintered body;
    a dielectric layer formed on the porous sintered body;
    a solid electrolyte layer formed on the dielectric layer;
    a cathode layer formed on the solid electrolyte layer; and
    a protective film having at least a portion formed on the cathode layer,
    wherein the protective film is made of a polymer that contains fluorine.
Clause 6.
  The solid electrolytic capacitor according to Clause 5, wherein the protective film does not contain Si.
Clause 7.
  The solid electrolytic capacitor according to Clause 5 or 6, wherein the protective film is made of a polymer including a perfluoroalkyl group having 6 carbon atoms ($C_6F_{13}$-R) and having a thermal decomposition temperature of 200° C. to 300° C.
Clause 8.
  The solid electrolytic capacitor according to any one of Clauses 1 to 7, wherein the protective film has a thickness of 0.01 to 5 μm.
Clause 9.
  The solid electrolytic capacitor according to Clause 8, wherein the protective film has a thickness of 0.1 to 2 μm.
Clause 10.
  The solid electrolytic capacitor according to any one of Clauses 1 to 9, further including:
    an anode conducting member joined to the anode wire; and
    a cathode conducting member joined to the cathode layer.
Clause 11.
  The solid electrolytic capacitor according to Clause 10, wherein at least a portion of the protective film is formed on the anode conducting member and the cathode conducting member.
Clause 12.
  The solid electrolytic capacitor according to Clause 10, wherein at least a portion of the protective film is arranged between the cathode layer and the cathode conducting member.
Clause 13.
  The solid electrolytic capacitor according to Clause 12, wherein the protective film covers all faces of the cathode layer.
Clause 14.
  The solid electrolytic capacitor according to any one of Clauses 10 to 13, further comprising:
    a sealing resin covering the entirety of the porous sintered body and the anode wire,
    wherein the anode conducting member includes an intermediate portion that is covered by the sealing resin and is joined to the anode wire, and an exposed portion that is a plate-shaped member and is joined to the intermediate portion,
    the cathode conducting member is a plate-shaped member, and
    a portion of the exposed portion and a portion of the cathode conducting member are exposed from the sealing resin and constitute an external terminal.

Clause 15.

The solid electrolytic capacitor according to any one of Clauses 1 to 14, wherein the porous sintered body has a rectangular parallelepiped shape.

Clause 16.

The solid electrolytic capacitor according to any one of Clauses 1 to 15, wherein the porous sintered body is made of Ta or Nb.

REFERENCE NUMERALS

A1 to A3 Solid electrolytic capacitor
100 Capacitor element
1 Porous sintered body
1a, 1b, 1c Face
15 Pore
11 Anode wire
11a Base end portion
2 Dielectric layer
3 Solid electrolyte layer
31 Inner layer
32 Outer layer
4 Cathode layer
41 Base layer
42 Upper layer
5 Sealing resin
5a Crack
6 Anode conducting member
6a External anode terminal
61 Intermediate portion
62 Exposed portion
7 Cathode conducting member
7a External cathode terminal
71 Conductive joining material
8 Protective film
92 Wire material
93 Porous body
96, 97 Lead frame

The invention claimed is:

1. A solid electrolytic capacitor comprising:
   a porous sintered body made of a valve metal;
   an anode wire that has a portion extending inside the porous sintered body, and that protrudes from the porous sintered body;
   a dielectric layer formed on the porous sintered body;
   a solid electrolyte layer formed on the dielectric layer;
   a cathode layer formed on the solid electrolyte layer; and
   a protective film having at least a portion formed on the cathode layer,
   wherein the protective film does not contain Si and includes a polymer that contains a perfluoroalkyl group, wherein the polymer has 6 carbon atoms ($C_6F_{13}$-R) and a thermal decomposition temperature of 200° C. to 300° C.

2. The solid electrolytic capacitor according to claim 1, wherein the protective film has a thickness of 0.1 to 2 μm.

3. The solid electrolytic capacitor according to claim 1, wherein at least a portion of the protective film is formed on an anode conducting member and a cathode conducting member.

4. The solid electrolytic capacitor according to claim 3, wherein at least a portion of the protective film is arranged between the cathode layer and the cathode conducting member.

5. The solid electrolytic capacitor according to claim 4, wherein the protective film covers all faces of the cathode layer.

6. The solid electrolytic capacitor according to claim 3, further comprising:
   a sealing resin covering the entirety of the porous sintered body and the anode wire,
   wherein the anode conducting member includes an intermediate portion that is covered by the sealing resin and is joined to the anode wire, and an exposed portion that is a plate-shaped member and is joined to the intermediate portion,
   the cathode conducting member is a plate-shaped member, and
   a portion of the exposed portion and a portion of the cathode conducting member are exposed from the sealing resin and constitute an external terminal.

7. The solid electrolytic capacitor according to claim 1, wherein the protective film has a thickness of 0.01 to 5 μm.

8. The solid electrolytic capacitor according to claim 1, further comprising:
   an anode conducting member joined to the anode wire; and
   a cathode conducting member joined to the cathode layer.

9. The solid electrolytic capacitor according to claim 1, wherein the porous sintered body has a rectangular parallelepiped shape.

10. The solid electrolytic capacitor according to claim 1, wherein the porous sintered body is made of Ta or Nb.

* * * * *